(12) United States Patent  
Sugawara et al.

(10) Patent No.: US 7,884,587 B2
(45) Date of Patent: Feb. 8, 2011

(54) POWER SUPPLY DEVICE AND IMAGE FORMING APPARATUS

(75) Inventors: Masae Sugawara, Miyagi (JP); Yuta Nomura, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 364 days.

(21) Appl. No.: 12/222,322

(22) Filed: Aug. 7, 2008

(65) Prior Publication Data

US 2009/0045792 A1  Feb. 19, 2009

(30) Foreign Application Priority Data

Aug. 7, 2007  (JP) ............... 2007-205349
Jun. 19, 2008  (JP) ............... 2008-160351

(51) Int. Cl.
G03G 15/20 (2006.01)
G05F 1/618 (2006.01)

(52) U.S. Cl. ............. 323/270; 323/271; 323/273; 323/274; 399/67; 399/69; 399/70

(58) Field of Classification Search ........... 323/270, 323/271, 273, 274; 399/69, 70, 67
See application file for complete search history.

(56) References Cited

U.S. PATENT DOCUMENTS

| 6,630,651 | B2 | 10/2003 | Ohishi et al. | |
|---|---|---|---|---|
| 6,806,448 | B2 | 10/2004 | Ohishi et al. | |
| 6,977,362 | B2 | 12/2005 | Ohishi et al. | |
| 7,122,767 | B2 | 10/2006 | Sato et al. | |
| 2002/0075085 | A1 * | 6/2002 | Nishida et al. | 331/36 C |
| 2002/0136031 | A1 * | 9/2002 | Yamaguchi et al. | 363/18 |
| 2002/0176216 | A1 * | 11/2002 | Del Signore, II et al. | 361/93.9 |
| 2004/0027400 | A1 * | 2/2004 | Ryu et al. | 347/5 |
| 2006/0237446 | A1 * | 10/2006 | Kishi et al. | 219/619 |
| 2007/0031159 | A1 * | 2/2007 | Kishi et al. | 399/69 |
| 2007/0216715 | A1 * | 9/2007 | Zhao et al. | 347/9 |

FOREIGN PATENT DOCUMENTS

| JP | 2-168819 | 6/1990 |
|---|---|---|
| JP | 04-060303 | 2/1992 |
| JP | 08-338602 | 12/1996 |
| JP | 10/0925242 | 4/1998 |
| JP | 2004-286869 | 10/2004 |
| JP | 2006-071418 | 3/2006 |
| JP | 2007-014180 | 1/2007 |

* cited by examiner

*Primary Examiner*—Bao Q Vu
(74) *Attorney, Agent, or Firm*—Harness, Dickey, & Pierce, P.L.C.

(57) ABSTRACT

A charging unit charges a capacitor that is configured to be charged and discharged to drive a load. A switching unit switches on and off between the capacitor and the charging unit. A delay control unit delays an output of a switching control signal for controlling the switching unit until an output voltage of the charging unit exceeds a voltage of the capacitor, and outputs a delayed switching control signal. An output unit receives the delayed switching control signal from the delay control unit, and outputs the delayed switching control signal to the switching unit so that the charging unit charges the capacitor.

9 Claims, 10 Drawing Sheets

POWER SUPPLY DEVICE AND IMAGE FORMING APPARATUS

CROSS-REFERENCE TO RELATED APPLICATIONS

The present application claims priority to and incorporates by reference the entire contents of Japanese priority document 2007-205349 filed in Japan on Aug. 7, 2007 and Japanese priority document 2008-160351 filed in Japan on Jun. 19, 2008.

BACKGROUND OF THE INVENTION

1. Field of the Invention

The present invention relates to a power supply device and an image forming apparatus.

2. Description of the Related Art

As an auxiliary power supply, a secondary battery and a capacitor are widely used. Generally, as a main power supply, for example, a solar cell, an aerogenerator, or a fuel cell is used. Alternatively, a commercial alternating-current (AC) power supply or an engine generator can be used as the main power supply. For example, in an electrophotographic printer, to expedite heating of a fixing unit for thermally fixing a toner image on a sheet, not only a main power supply but also an auxiliary power supply may be necessary to supply a sufficient power to the fixing unit.

Generally, a charging circuit (charging unit) is connected between the main power supply and the auxiliary power supply. In addition, to prevent overcharging, a charging control circuit is used to stop charging the auxiliary power supply when the power charged in the auxiliary power supply is saturated.

Furthermore, a diode for preventing a back flow is inserted in a charging line (PFf and PFb) between the charging circuit and the auxiliary power supply to prevent a discharge of the auxiliary power supply toward the charging circuit when the charging unit stops charging the auxiliary power supply. While the auxiliary power supply is charged, a current flows forward in the diode. However, the diode has a forward voltage drop that causes a power loss. Specifically, when a typical pn junction diode is used, which is the easiest method, the pn junction diode has a forward voltage drop of about 0.7 volt. Alternatively, a Schottky diode having a forward voltage drop of 0.3 volt to 0.4 volt can be used. However, even when the Schottky diode is used, the power loss due to its forward voltage drop cannot be ignored in some power supplies, such as a solar power generator, a wind power generator, and a high-efficient auxiliary power supply. To prevent such a power loss, a method using a diode and a switching unit, such as a relay switch or a semiconductor switch, connected in parallel can be adopted. In this method, the switching unit is turned on (closed) during charging, and the switching unit is turned off (open) while the charging stops to prevent the back flow from the auxiliary power supply to the charging circuit.

For example, Japanese Patent Application Laid-open No. H2-168819 discloses a technology using a back-flow preventing unit with a power loss lower than that of the Schottky diode. The back-flow preventing unit includes a diode and a switch connected in parallel. The switch includes a transistor having a forward voltage drop lower than that of the diode. In the instance when a main power supply is cut off, the switch is turned off, thereby preventing a back flow.

However, in the technology disclosed in Japanese Patent Application Laid-open No. H2-168819, the switch is turned off only when the main power supply of the charging circuit is cut off and the technology cannot be used to prevent a back flow caused when the voltage of the auxiliary power supply on a side of a load is higher than an output voltage of the charging circuit during the charging, which is problematic.

SUMMARY OF THE INVENTION

It is an object of the present invention to at least partially solve the problems in the conventional technology.

According to an aspect of the present invention, there is provided a power supply device including a capacitor configured to be charged and discharged to drive a load; a charging unit that charges the capacitor; a switching unit that switches on and off between the capacitor and the charging unit; a delay control unit that delays an output of a switching control signal for controlling the switching unit until an output voltage of the charging unit exceeds a voltage of the capacitor, and outputs a delayed switching control signal; and an output unit that receives the delayed switching control signal from the delay control unit, and outputs the delayed switching control signal to the switching unit so that the charging unit charges the capacitor.

Furthermore, according to another aspect of the present invention, there is provided an image forming apparatus including a power supply device, which includes a capacitor configured to be charged and discharged to drive a load; a charging unit that charges the capacitor; a switching unit that switches on and off between the capacitor and the charging unit; a delay control unit that delays an output of a switching control signal for controlling the switching unit until an output voltage of the charging unit exceeds a voltage of the capacitor, and outputs a delayed switching control signal; and an output unit that receives the delayed switching control signal from the delay control unit, and outputs the delayed switching control signal to the switching unit so that the charging unit charges the capacitor. The capacitor supplies a power to a load of the image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. A multifunction peripheral (MFP) 1 according to an embodiment of the present invention is explained below as an example of an image forming apparatus. As the image forming apparatus, for example, a digital copier, a printer, or a facsimile machine that performs image forming can be alternatively adopted.

Figure 1:
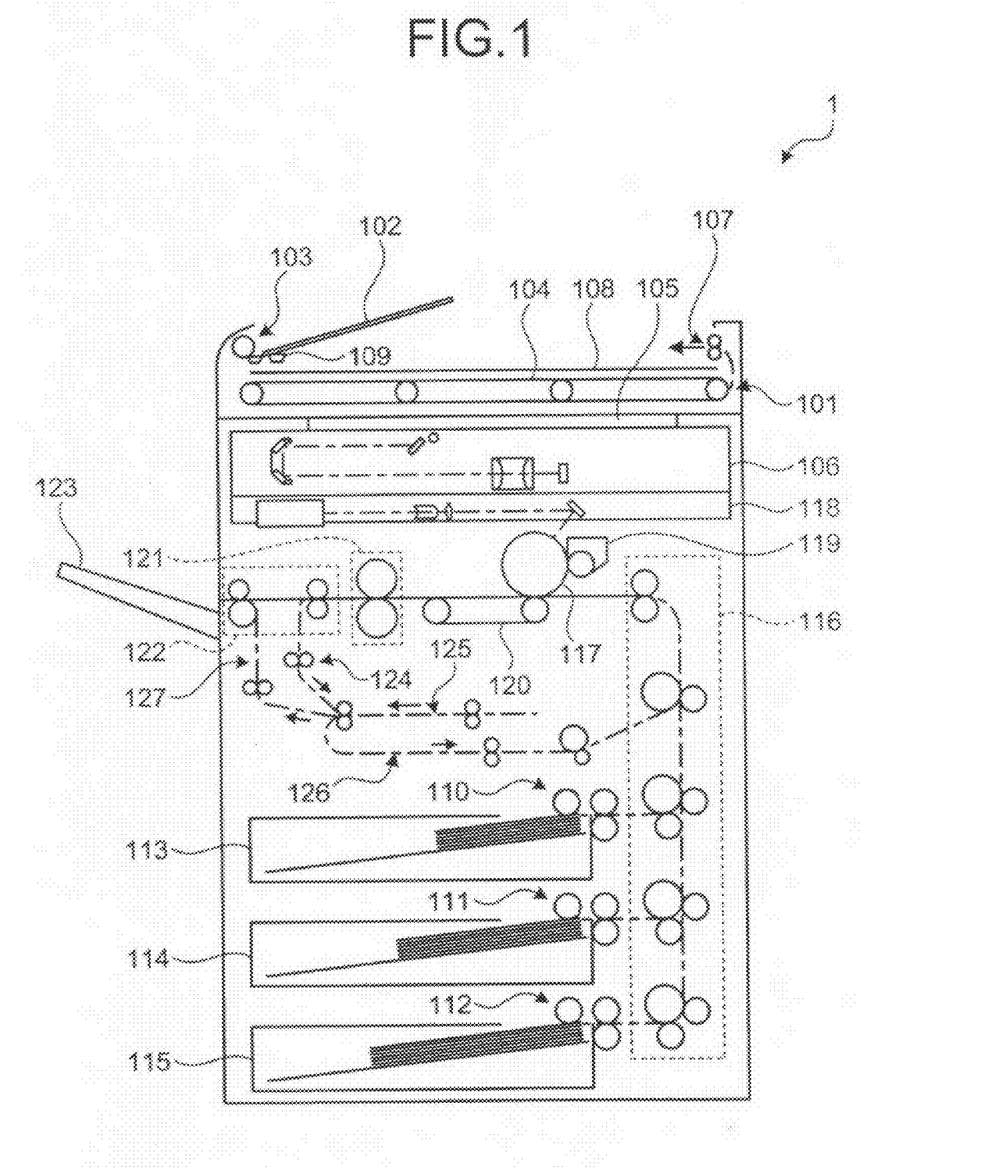
FIG. 1 is a schematic diagram of an image forming apparatus according to an embodiment of the present invention.

FIG. 1 is a schematic diagram of the MFP 1. The MFP 1 has functions of a copier, a printer, a facsimile (FAX) machine, and the like. The function of the MFP 1 can be switched between the copier, the printer, and the FAX machine, which can be selected by a user via an application key on an operation unit (not shown).

The configuration and operations of the MFP 1 in the copying mode are explained below. As shown in FIG. 1, in an automatic document feeder (ADF) 101, a sheet of an original (hereinafter, "original sheet") is placed on an original tray 102 with an image side up. When a start key on the operation unit is selected, the original sheet is fed to a predetermined position on a contact glass 105 by a feeding roller 103 and a conveying belt 104. The ADF 101 is configured to count up the number of original sheets fed. After image information on the original sheet on the contact glass 105 is read by an image reading device 106, the original sheet is discharged to a discharge tray 108 by the conveying belt 104 and a discharging roller 107.

When an original detecting unit 109 detects that the next original sheet is present on the original tray 102, an original sheet at the bottom of the original sheets stacked on the original tray 102 is fed to the predetermined position on the contact glass 105, the original sheet is discharged to the discharge tray 108 by the conveying belt 104 and the discharging roller 107 after the image information on the original sheet on the contact glass 105 is read by the image reading device 106. The feeding roller 103, the conveying belt 104, and the discharging roller 107 are driven by a transfer motor (not shown).

When being selected, each of the first, the second, and the third feeding devices 110, 111, and 112 feeds one of recording sheets stacked thereon. The recording sheet is conveyed to a position where the recording sheet is in contact with a photosensitive member 117 by a vertical conveying unit 116. For example, a photosensitive drum is used as the photosensitive member 117. The photosensitive member 117 is rotated by a main motor (not shown).

After the image information read by the image reading device 106 from the original sheet is processed by an image processing device (not shown) into image data, the image data is converted into optical information by a writing unit 118. After the photosensitive member 117 is uniformly charged by a charging unit (not shown), the photosensitive member 117 is exposed with the optical information from the writing unit 118, so that an electrostatic latent image is formed on the photosensitive member 117. The electrostatic latent image on the photosensitive member 117 is developed using toner by a developing device 119, so that a toner image is formed on the photosensitive member 117. The writing unit 118, the photosensitive member 117, the developing device 119, and other devices (not shown) near the photosensitive member 117 constitute a printer engine.

A transfer belt 120 functions as a conveying unit and a transfer unit. Specifically, the transfer belt 120 applied with a transfer bias from a power supply transfers the toner image onto the recording sheet from the vertical conveying unit 116 while conveying the recording sheet at the same speed as that of the photosensitive member 117. The toner image on the recording sheet is fixed by a fixing unit 121, and the recording sheet on which the toner image is fixed is discharged to a discharge tray 123 by a discharging unit 122. The toner residing on the photosensitive member 117 is cleaned by a cleaning device (not shown) after the toner image is transferred from the photosensitive member 117 onto the recording sheet.

The operations of the MFP 1 explained above are performed when forming an image on one side of a recording sheet in a normal copying mode. On the other hand, when forming images on both sides of a recording sheet in a double-sided copying mode, after a recording sheet is fed from one of feeding trays 113 to 115 and an image is formed on one side of the recording sheet, the recording sheet is conveyed not to the discharge tray 123 but to a double-sided-image-formation path 124 by the discharging unit 122. A reversing unit 125 reverses the recording sheet and conveys the recording sheet to a double-sided-image-formation conveying unit 126.

Thereafter, the recording sheet is conveyed to the vertical conveying unit 116 by the double-sided-image-formation conveying unit 126 and conveyed by the vertical conveying unit 116 to a position where the recording sheet is in contact with the photosensitive member 117. Thereafter, as explained above, the toner image is transferred onto the other side of the recording sheet and the toner image on the recording sheet is fixed by the fixing unit 121. In this manner, the double-sided recording sheet is obtained. The double-sided recording sheet is conveyed to the discharge tray 123 by the discharging unit 122.

When discharging a recording sheet in a reversed state, after the recording sheet is reversed by the reversing unit 125, the recording sheet is not conveyed to the double-sided-image-formation conveying unit 126 but discharged to the discharge tray 123 by the discharging unit 122 via a reversed-sheet discharging path 127.

In the printing mode, the writing unit 118 receives image data from an external device, and an image is formed on a recording sheet in the same manner based on the image data.

In the facsimileing mode, when sending image data, a facsimileing unit receives image data from the image reading device 106 and sends the image data to a FAX machine on a receiver side. On the other hand, when receiving image data, the facsimileing unit receives image data from a FAX machine on a sender side, the writing unit 118 receives the image data from the facsimileing unit, and forms an image on a recording sheet based on the image data.

The MFP 1 further includes a large capacity tray (LCT) (not shown), a finishing unit that performs, for example, sorting, punching, and stapling, and an operation unit that sets a mode in which original sheets are read, a copy magnification, post-processing by the finishing unit, selects a sheet feeding cassette, and displays related items to an operator.

Figure 2:
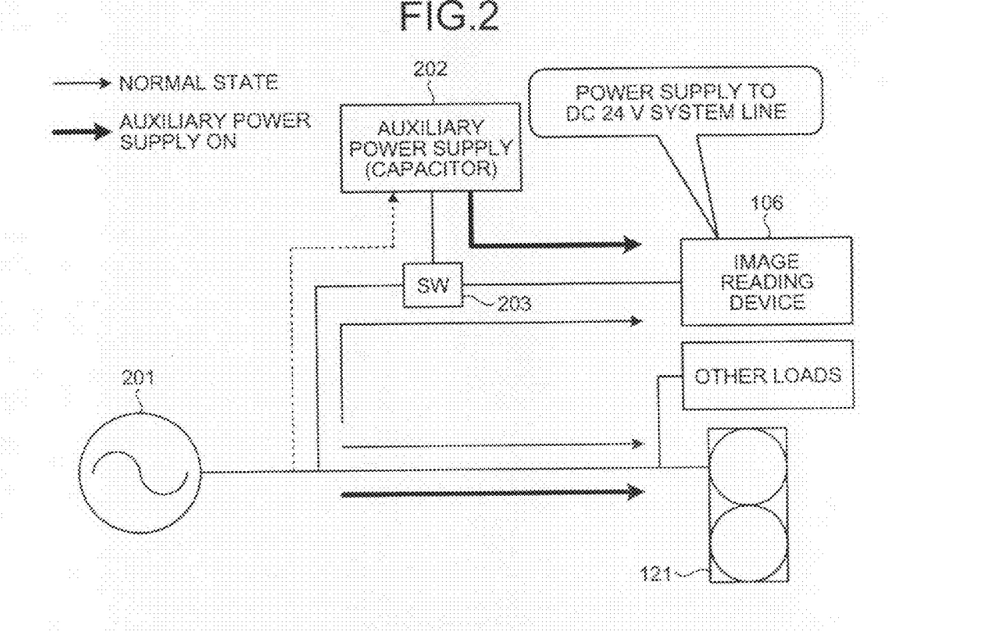
FIG. 2 is a schematic diagram for explaining an example of a power supply control process performed by a power supply device.
Figure 3:
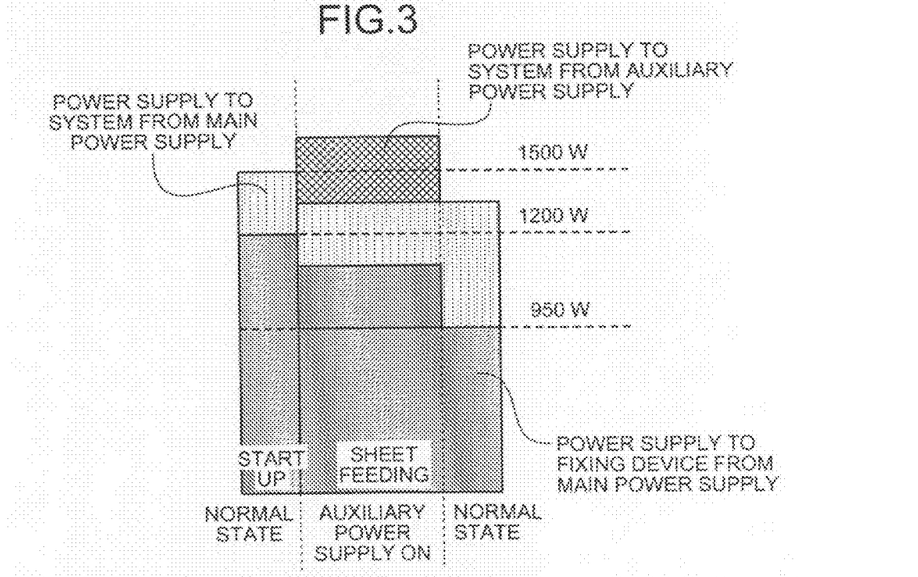
FIG. 3 is a chart of an example of levels of power supplies from a main power supply and an auxiliary power supply to loads.

A power supply control process performed by the power supply device of the MFP 1 is explained below with reference to FIGS. 2 and 3. FIG. 2 is a schematic diagram for explaining an example of the power supply control process performed by the power supply device. FIG. 3 is a chart of an example of levels of power supplies from a main power supply and an auxiliary power supply to loads.

A commercial AC power supply 201 is a main power supply that drives the image reading device 106, the fixing unit 121, and other loads including the printer engine and various types of motors. An auxiliary power supply 202 is configured to be charged and discharged. Specifically, the auxiliary power supply 202 is charged by being supplied with a power from the AC power supply 201 and drives the loads using the charged power. The auxiliary power supply 202 is a capacitor. Alternatively, a battery can be used as the auxiliary power supply 202. As the capacitor, an aluminum electrolytic capacitor or an electric double layer capacitor with a relatively large capacitance is used. A switch 203 switches on/off charging from the AC power supply 201 to the auxiliary power supply 202 and switches on/off a power supply from the auxiliary power supply 202. The switch 203 connects, for example, a common contact on a side of the auxiliary power supply 202 to any one of a contact on a side of the AC power supply 201, a contact on a side of the image reading device 106, and a contact that is not connected to either the contact on the side of the AC power supply 201 and the contact on the side of the image reading device 106. The function of the switch 203 can be achieved by combining at least two relays and a field-effect transistor (FET). When the power supply device is in a normal state when, for example, starting a power supply, the switch 203 switches off and a power is supplied from the AC power supply 201 to a system line including the image reading device 106, the fixing unit 121, and other loads. When there is a surplus power from the AC power supply 201, the switch 203 is connected to the contact on the side of the AC power supply 201, thereby charging the auxiliary power supply 202. When the auxiliary power supply 202 is used to, for example, simultaneously driving the image reading device 106 and the fixing unit 121, the switch 203 is connected to the contact on the side of the image reading device 106 to drive the image reading device 106 using the power supply from the auxiliary power supply 202, so that the amount of power supplied from the AC power supply 201 to the fixing unit 121 is increased. In the example shown in FIG. 2, only the image reading device 106 is supplied with the power from the auxiliary power supply 202. Alternatively, for example, the auxiliary power supply 202 can be configured to supply a power to the fixing unit 121 and other lads in addition to the image reading device 106. The configuration and operations of the power supply device of the MFP 1 is explained below.

Figure 4:
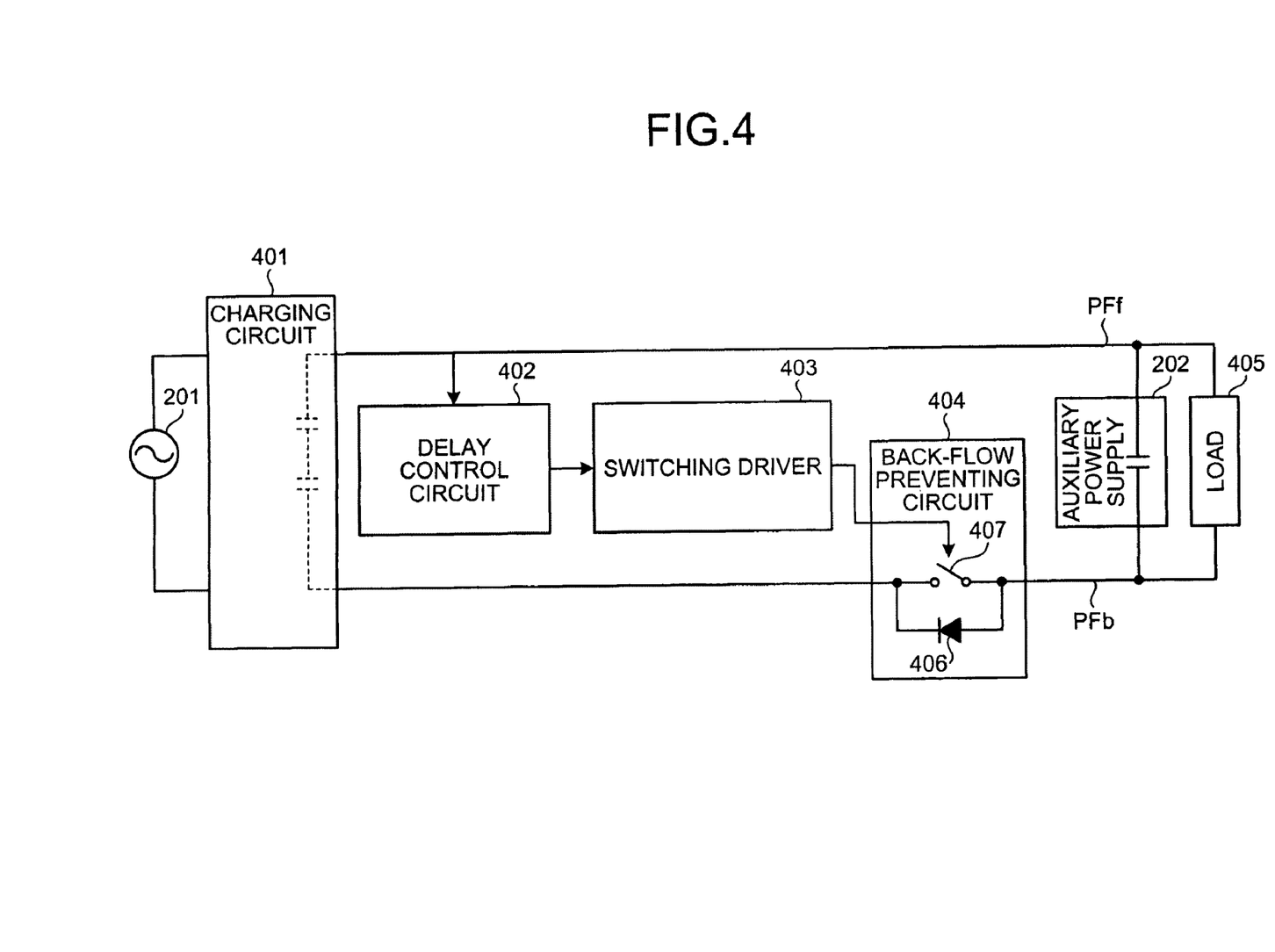
FIG. 4 is a block diagram of a power supply device according to the embodiment.

FIG. 4 is a block diagram of the power supply device of the MFP 1. A load 405 includes the fixing unit 121, the image reading device 106, the printer engine, and other loads including the motors. A charging circuit 401 that charges the auxiliary power supply 202 is connected between the AC power supply 201 and the auxiliary power supply 202. The charging circuit 401 includes an AC/DC converter that converts a voltage of the AC power supply 201 into a direct-current (DC) voltage, and a DC/DC converter that converts a DC output from the AC/DC converter into a power to be supplied to the auxiliary power supply 202. In the DC/DC converter, the DC voltage undergoes chopping by a chopping circuit and the chopped voltage is applied to a primary coil of a transformer and the voltage induced across a secondary coil of the transformer is rectified by a diode and the rectified voltage is smoothed by a capacitor.

Instead of the coil transformer, a piezoelectric transducer can be used. In either case, because a capacitor for smoothing (accumulation) is in an early stage of a power supply output end of the charging circuit 401, an output voltage of the charging circuit 401 gradually increases from a microscopic viewpoint when charging the auxiliary power supply 202 is started, i.e., when a charging voltage is applied from the AC power supply 201 to the charging circuit 401. For this reason, when a switch 407 of a back-flow preventing circuit 404, which is explained in detail below, switches on at the same time when the charging starts, a back flow can be caused via the switch 407 (for example, a relay switch) or a malfunction of the switch 407 (semiconductor switch) can be caused due to application of an opposite polarity overvoltage to the switch 407. To prevent the back flow and the malfunction of the switch 407, the power supply device has the following configuration.

The DC/DC converter performs chopping on the DC voltage in response to a charging/stopping instruction signal from an external device (not shown), thereby generating and sending an operating/non-operating instruction signal to a switching unit that repeats on/off at a high frequency. When the external device switches the level of the charging/stopping instruction signal to a charging instruction level H, the charging circuit 401 generates a charging output voltage and outputs the charging output voltage to a charging line PFf. On the other hand, when the external device switches the level of the charging/stopping instruction signal to a stopping instruction level L, the charging circuit 401 stops outputting the charging output voltage. As shown in FIG. 4, the back-flow preventing circuit 404 is interposed in a feedback line PFb. Although the AC power supply 201 is used as the main power supply, a DC power supply can be alternatively used as the main power supply. When the DC power supply is used, the charging circuit 401 does not include the AC/DC converter.

The back-flow preventing circuit 404 includes a diode 406 and the switch 407 that switches on/off between the auxiliary power supply 202 and the charging circuit 401. Although the switch 407 is denoted by a symbol of a mechanical switch (for example, a relay switch) as shown in FIG. 4, the symbol denotes a switching unit with a voltage drop smaller than a forward voltage drop of the diode 406 (i.e., an extremely low conduction resistance). Practically, the switch 407 is a bipolar transistor, a metal oxide semiconductor (MOS) transistor, an insulated gate transistor (IGT), a mercury relay, or an electromagnetic relay.

On a condition that the voltage of the charging line PFf (i.e., the output voltage of the charging circuit 401) is over the voltage of the auxiliary power supply 202, a delay control circuit 402 and a switching driver 403 causes the switch 407 to switch on such that the charging circuit 401 charges the auxiliary power supply 202. Specifically, the delay control circuit 402 generates a charging signal at a high level H (hereinafter, "charging signal (H)") after a delay time Tdp from the start of charging by the charging circuit 401. When stopping charging, the delay control circuit 402 eliminates the charging signal (H), i.e., the level of the charging signal switches to a low level (L). While the charging signal (H) is maintained, the switching driver 403 causes the switch 407 to switch on. On the other hand, when the charging signal (H) is eliminated and the level of the charging signal switches to the low level (L), the switching driver 403 causes the switch 407 to switch off.

Figure 5:
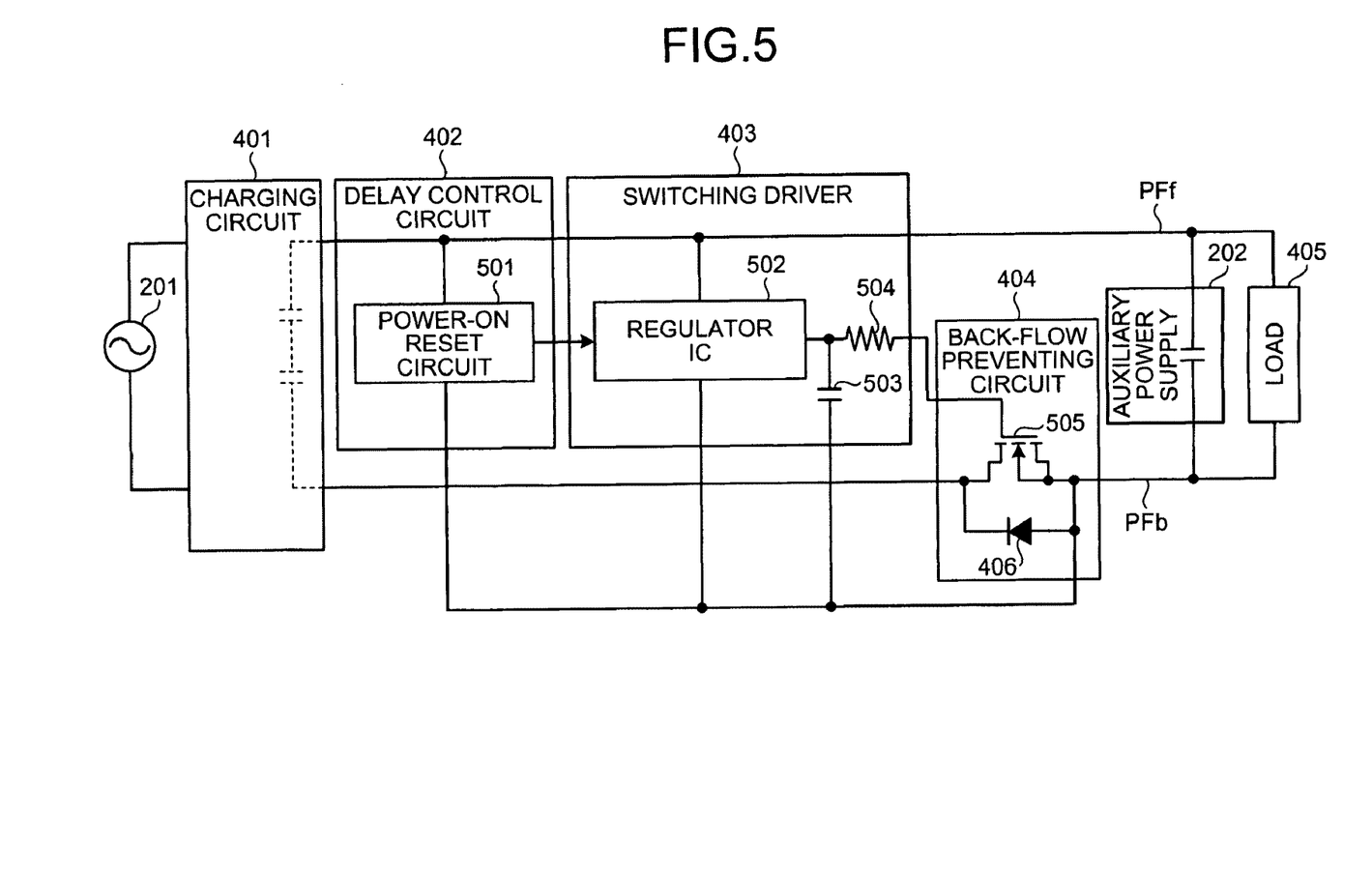
FIG. 5 is a block diagram of a power supply device of Example 1.

FIG. 5 is a block diagram of a power supply device of Example 1. In Example 1, the back-flow preventing circuit 404 includes a negative channel metal oxide semiconductor (nMOS) transistor 505 as the switch 407. Furthermore, as the delay control circuit 402, a commercially available power-on reset circuit 501 that delays an output of a power-on reset signal (a switching control signal) for causing the nMOS transistor 505 to switch on until the voltage of the charging line PFf exceeds the voltage of the auxiliary power supply 202 is used. By utilizing the characteristics of the charging circuit 401 that the output of the charging circuit 401 gradually increases, the power-on reset circuit 501 outputs a power-on reset signal (H) that is the charging signal (H) when the output of the charging circuit 401 reaches a predetermined voltage Tpo. The switching driver 403 includes a commercially available regulator integrated circuit (IC) with ON/OFF function 502 and an RC time constant circuit including a capacitor 503 and a resistor 504. In response to the charging signal (H) from the power-on reset circuit 501, the regulator IC 502 outputs a transistor-on instruction signal (H) to the nMOS transistor 505 such that the charging circuit 401 can charge the auxiliary power supply 202. The RC time constant circuit further delays the transistor-on instruction signal (H) from the regulator IC 502. Specifically, the capacitor 503 and the resistor 504 delay the rise of the transistor-on instruction signal (H) by a delay time Tds to compensate an insufficiency of the delay time Tdp caused by the power-on reset circuit 501 and to prevent the nMOS transistor 505 from erroneously switching on due to an abnormal H pulse resulting from, for example, a noise. As explained above, because the power-on reset circuit 501 and the regulator IC 502, which are commercially available, are respectively used for the delay control circuit 402 and the switching driver 403 in the power supply device of Example 1, downsizing the power supply device can be achieved at low cost.

Figure 6:
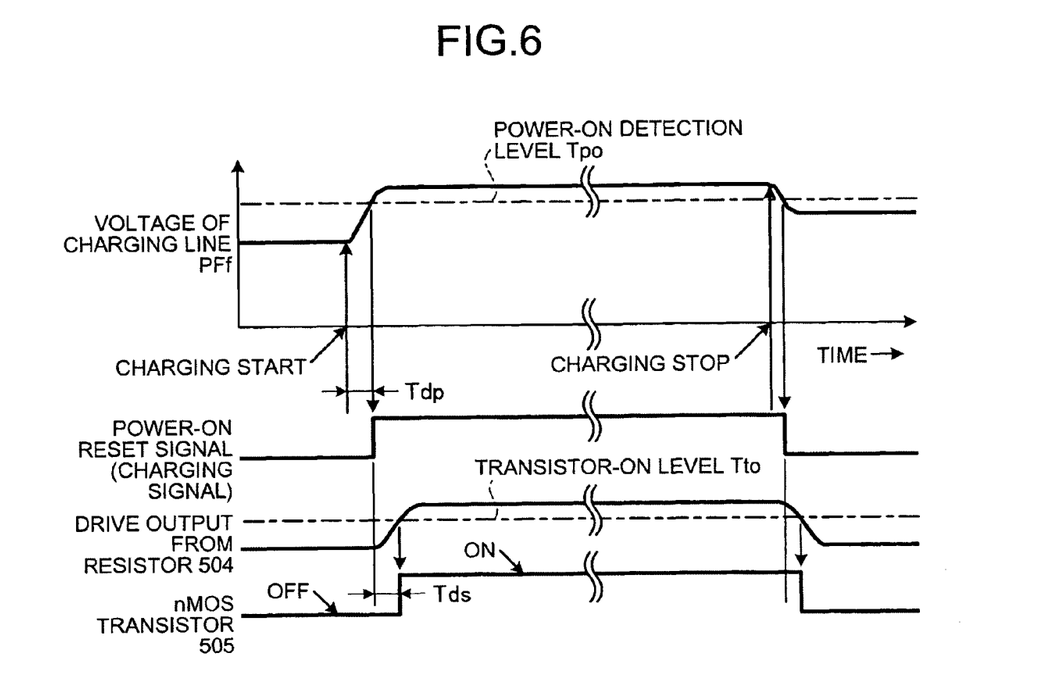
FIG. 6 is a graph of a relationship between voltage variations of a charging line PFf, a charging signal (H) (i.e., power-on reset signal) that is an output of a delay control circuit, an output voltage (drive output from a resistor) of a switching driver, and on/off of an nMOS transistor.

FIG. 6 is a graph of a relationship between voltage variations of the charging line PFf, a charging signal (H) (i.e., power-on reset signal) that is an output of the delay control circuit 402, the output voltage of the switching driver 403 (a drive output from the resistor 504), and on/off of the nMOS transistor 505.

When the output voltage of the charging circuit 401 is lower than that of the auxiliary power supply 202, the power-on reset circuit 501 outputs a charging signal (L), thereby turning off the regulator IC 502. As a result, the nMOS transistor 505 switches on. When charging the auxiliary power supply 202 is started, the output voltage of the charging circuit 401 increases. When the output voltage of the charging circuit 401 exceeds the predetermined voltage Tpo, the power-on reset circuit 501 outputs the charging signal (H) to the regulator IC 502 after the delay time Tdp. Based on the charging signal (H), the regulator IC 502 outputs the transistor-on instruction signal (H), so that the nMOS transistor 505 switches on. When the charging circuit 401 stops charging the auxiliary power supply 202, the voltage of the charging line PFf decreases to the value equal to the voltage of the auxiliary power supply 202, and when the output voltage decreases to a value under the predetermined voltage Tpo, the output (charging signal) of the power-on reset circuit 501 decreases to the low level, which means that the power supply is cut off, i.e., the charging signal (H) is eliminated. In response to the elimination of the charging signal (H), the output of the regulator IC 502 decreases to a transistor-off instruction signal (L) and the capacitor 503 discharges the power to an output end (L) of the regulator IC 502, so that the output voltage of the resistor 504 decreases to a value under a transistor-on level Tto. As a result, the nMOS transistor 505 switches off (open).

In Example 1, the power-on reset circuit 501 is used as the delay control circuit 402. Alternatively, for example, a timer IC can be used as the delay control circuit 402. The timer IC starts counting the time after the voltage of the charging line PFf reaches the predetermined voltage Tpo, and generates a time-up signal H (charging signal (H)) when the time counted by the timer IC reaches a predetermined value. When the level of the charging/stopping instruction signal to be output to the charging circuit 401 from the external device switches to the stopping instruction level L, the timer IC is reset and the time-up signal H (charging signal H) is eliminated (i.e., the level of the time-up signal L switches to a low level L). Furthermore, in Example 1, the regulator IC 502 is used for the switching driver 403. Alternatively, other drive circuits such as a control circuit for adjusting an H and L logics of signals and a totem-pole driver circuit can be used in combination. Furthermore, when a drain-substrate diode of the nMOS transistor 505 is used as a diode for preventing a back flow, the diode 406 can be omitted.

Figure 7:
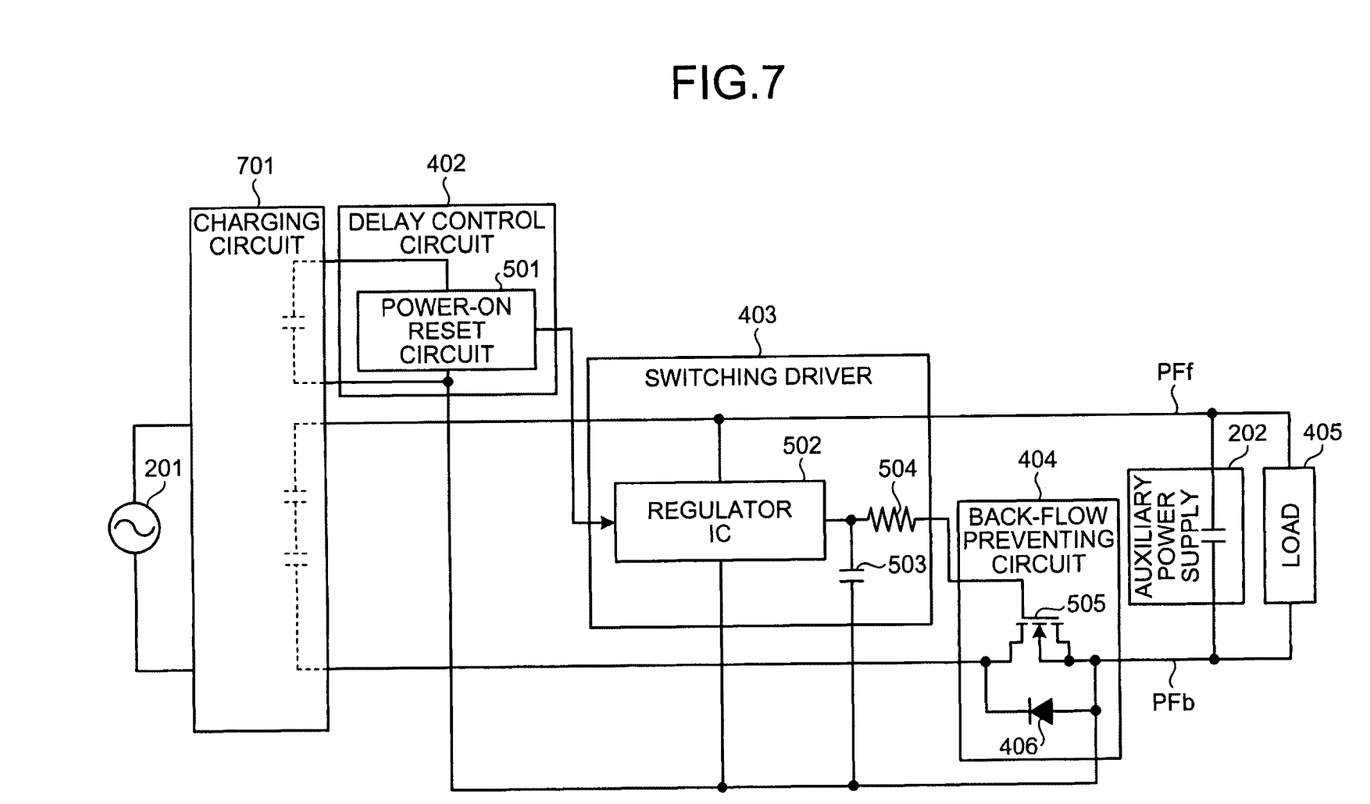
FIG. 7 is a block diagram of a power supply device of Example 2.

FIG. 7 is a block diagram of a power supply device of Example 2. The power supply device of Example 2 includes a charging circuit 701 that outputs a control voltage for determining whether the auxiliary power supply 202 is in being charged to the power-on reset circuit 501. A DC/DC converter of the charging circuit 701 has a secondary coil and a rectifying-smoothing circuit of a secondary system for outputting the control voltage, and the power-on reset circuit 501 is connected to an output end of the rectifying-smoothing circuit of the secondary system. When the power-on reset circuit 501 determines that the auxiliary power supply 202 is being charged based on the control voltage output from the charging circuit 701, the power-on reset circuit 501 delays a switching operation of the nMOS transistor 505 until the output voltage of the charging circuit 701 exceeds the voltage of the auxiliary power supply 202. In Example 2, when the charging circuit 701 outputs the control voltage at a predetermined level, the power-on reset circuit 501 outputs the charging signal (H) after the delay time Tdp. On the other hand, when the charging circuit 701 outputs 0 volt, the power-on reset circuit 501 outputs the charging signal (L). Other configurations of the power supply device of Example 2 are basically same as those of Example 1 (see, FIG. 5). Because the output end of the secondary system is not connected to the charging line PFf (the voltage of the auxiliary power supply 202), the control voltage is at the predetermined level during charging and is 0 volt (at a grounding level) while the charging stops. Therefore, on/off of the power supply (charging/not-charging) can be accurately determined based on a simple setting of a reference voltage. Furthermore, an erroneous operation due to variations of the power value of the electronic units and an error in detecting an increase/reduction of the charging signal (power-supply on signal) are not caused.

Figure 8:
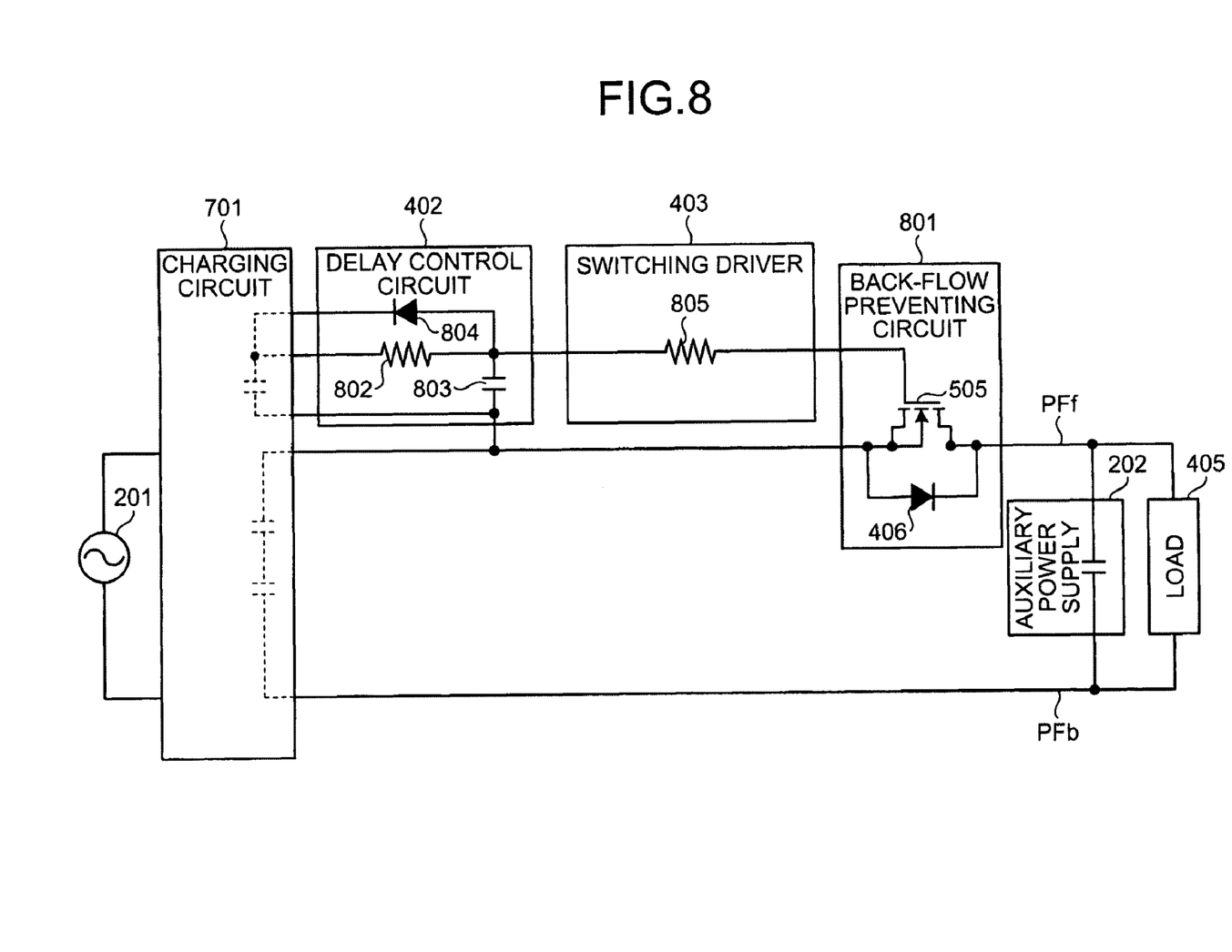
FIG. 8 is a block diagram of a power supply device of Example 3.

FIG. 8 is a block diagram of a power supply device of Example 3. In Example 3, a back-flow preventing circuit 801 is interposed in the charging line PFf. As Example 2 (see, FIG. 7), the charging circuit 701 includes the secondary coil and the rectifying-smoothing circuit of the secondary system for outputting the control voltage. However, different from Example 2, the RC time constant circuit (a resistor 802 and a capacitor 803) that delays the output of the transistor-on instruction signal (H) until the voltage of the charging line PFf exceeds the voltage of the auxiliary power supply 202 is connected to the output end of the rectifying-smoothing circuit of the secondary system. In addition, a diode 804 for discharging the power charged in the capacitor 803 after the switching operation of the nMOS transistor 505 is connected in parallel to the resistor 802 to cause the nMOS transistor 505 to switch off at the same time when the charging stops. In Example 3, based on the charging signal delayed by the simple RC time constant circuit including the resistor 802 and the capacitor 803, the nMOS transistor 505 is turned on/off via a resistor 805 of the switching driver 403. At the same time when the charging starts, charging the capacitor 803 is started via the resistor 802. After a predetermine time, the charged voltage of the capacitor 803 reaches a predetermined level at which the nMOS transistor 505 switches on, and the nMOS transistor 505 switches on. When the charging stops, because the capacitor 803 discharges the power via the diode 804, the level of the voltage of the capacitor 803 decreases to a transistor-off level and the nMOS transistor 505 switches off at an early stage. When the delay of the decrease of the voltage of the capacitor 803 is not problematic, the diode 804 is unnecessary. In this case, the delay control circuit 402 can be achieved with a simple configuration at low cost. Furthermore, because the power charged in the capacitor 803 is discharged via the diode 804 when the charging stops, the auxiliary power supply 202 and the charging circuit 701 can be non-conductive at an early stage, which prevents a back flow from the auxiliary power supply 202 to the charging circuit 701.

Figure 9:
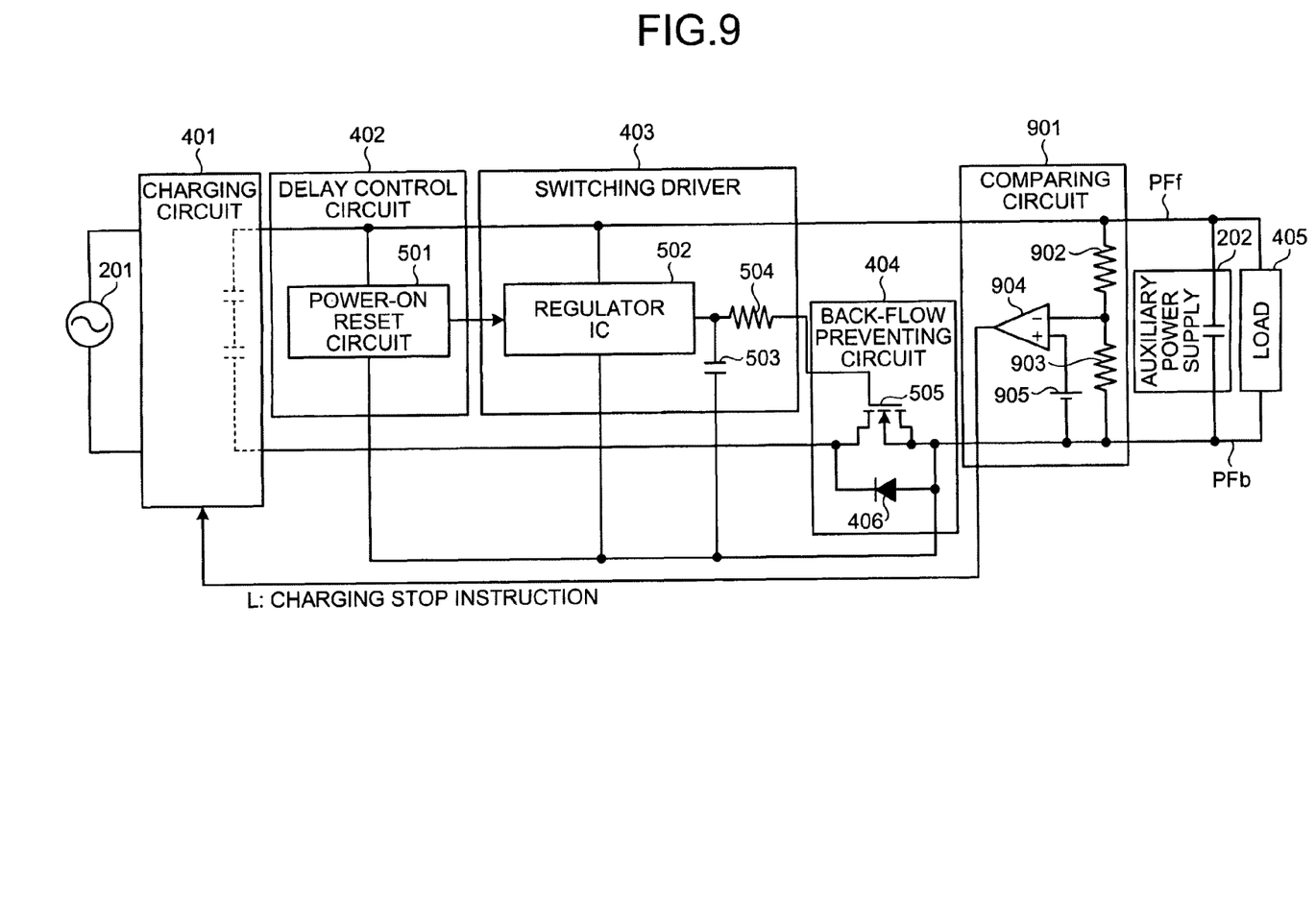
FIG. 9 is a block diagram of a power supply device of Example 4.

FIG. 9 is a block diagram of a power supply device of Example 4. The power supply device of Example 4 basically has the same configuration as those of Example 1 (see, FIG. 5) except that the power supply device of Example 4 includes a comparison circuit 901 that compares the voltage of the auxiliary power supply 202 with a reference voltage. The charging circuit 401 not only starts/stops charging in response to the charging/stopping instruction signal from the external device but also stops a charging operation (stops an output) in response to a charging completion signal (L) from the comparison circuit 901. A comparator 904 of the comparison circuit 901 compares the voltage of the auxiliary power supply 202 (the voltage of the charging line PFf) processed by resistors 902 and 903 by voltage division with the reference voltage generated by a reference voltage generating unit 905. The reference voltage corresponds to the saturated voltage or overcharging of the auxiliary power supply 202. When the voltage of the auxiliary power supply 202 reaches the reference voltage, the level of an output of the comparator 904 switches to L. In response to the decrease of the level of the output of the comparator 904, the charging circuit 401 stops charging the auxiliary power supply 202. In this manner, overcharging the auxiliary power supply 202 can be prevented. When the voltage processed by the resistors 902 and 903 by voltage division reaches the reference voltage, the level of the output (the charging completion signal) of the comparator 904 switches from H to L.

Figure 10:
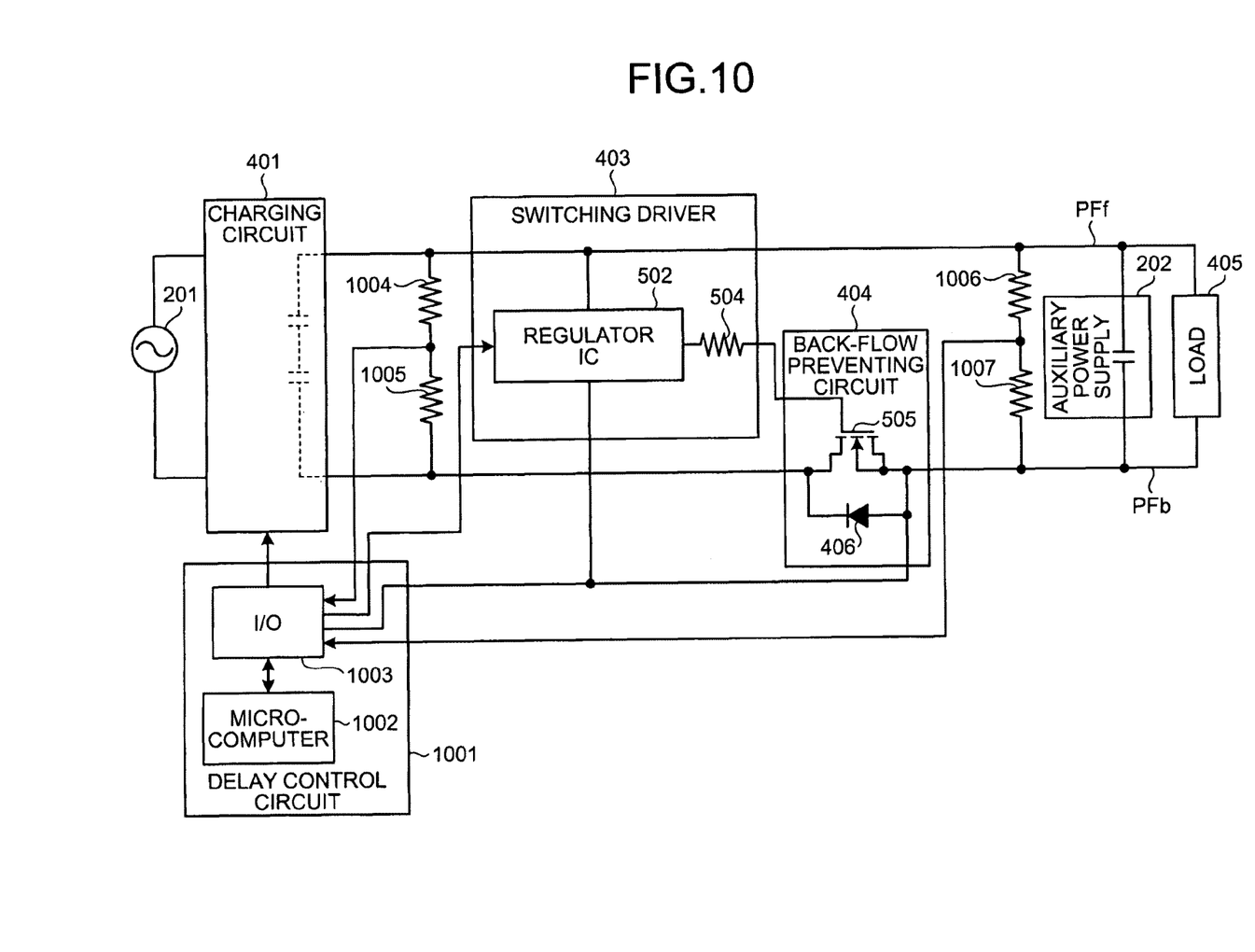
FIG. 10 is a block diagram of a power supply device of Example 5.

FIG. 10 is a block diagram of a power supply device of Example 5. In Example 5, a microcomputer 1002 that outputs the charging/stopping instruction signal to the charging circuit 401 to start/stop charging. A delay control circuit 1001 includes the microcomputer 1002 and an input/output (I/O) interface 1003. Voltage division resistors 1004 and 1005 for detecting the output voltage of the charging circuit 401 are arranged on a side of the charging circuit 401 with respect to the back-flow preventing circuit 404. In addition, voltage division resistors 1006 and 1007 for detecting the charged voltage of the auxiliary power supply 202 are arranged on a side of the auxiliary power supply 202 with respect to the back-flow preventing circuit 404. Except for the voltage division resistors 1004, 1005, 1006, and 1007, the power supply device of Example 5 basically has the same configuration as that of Example 1 (see, FIG. 5). However, because the microcomputer 1002 determines a delay time (Tdp+Tds) before the nMOS transistor 505 switches on as explained below, the capacitor 503 is omitted in Example 5.

When the microcomputer outputs a charging instruction to the charging circuit 401, the output (transistor-on instruction signal) of the regulator IC 502 is at the transistor-off level (L) and the nMOS transistor 505 switches off. After the microcomputer 1002 outputs the charging instruction to the charging circuit 401 (i.e., switches the level of the charging/stopping instruction signal to the charging instruction level), the microcomputer 1002 reads the voltage on the charging side, which is processed by voltage division via the voltage division resistors 1004 and 1005, and the voltage on the charged side processed by voltage division via the voltage division resistors 1006 and 1007. Specifically, the voltage on the charging side and the voltage on the charged side are converted into DC voltages via the I/O interface 1003 and the microcomputer 1002 reads the DC voltages. Reading the voltages on the charging side and the charged side is repeated at a predetermined cycle. When the value obtained by subtracting the voltage on the charged side from the voltage on the charging side is a negative value, the level of the control signal (charging signal) is maintained L, i.e., the nMOS transistor 505 maintains a switch off. When the value obtained by subtracting the voltage on the charged side from the voltage on the charging side is a positive value and the voltage on the charging side enters a stable state, the microcomputer 1002 determines the charged current or the charged power from the charging circuit 401 to the auxiliary power supply 202 based on the value obtained by subtracting the voltage on the charged side from the voltage on the charging side. Based on the value of the determined charged current or the charged power and an output capacitance of the charging circuit 401, the microcomputer 1002 calculates a charging time in which the voltage on the charged side reaches the voltage on the charging side. Based on the charging time, the microcomputer 1002 determines the delay time, and switches the level of the control signal to be output to the regulator IC 502 to H (the charging signal (H)). In response to the control signal, the regulator IC 502 outputs the transistor-on instruction signal (H) and the nMOS transistor 505 switches on.

Thereafter, when charging stop conditions such as completion of charging the auxiliary power supply 202 are satisfied, the microcomputer 1002 switches the level of the control signal (charging signal) output to the regulator IC 502 to L, i.e., eliminates the charging signal (H). As a result, the nMOS transistor 505 switches off.

In the power supply device of Example 5, the delay time is determined based on the calculated charging time and the nMOS transistor 505 switches on after the delay time. Alternatively, the nMOS transistor 505 can switch on when the voltage on the charging side reaches the voltage on the charged side. In this case, the delay time is a time from the start of charging until the voltage on the charging side reaches the voltage on the charged side.

Figure 11:
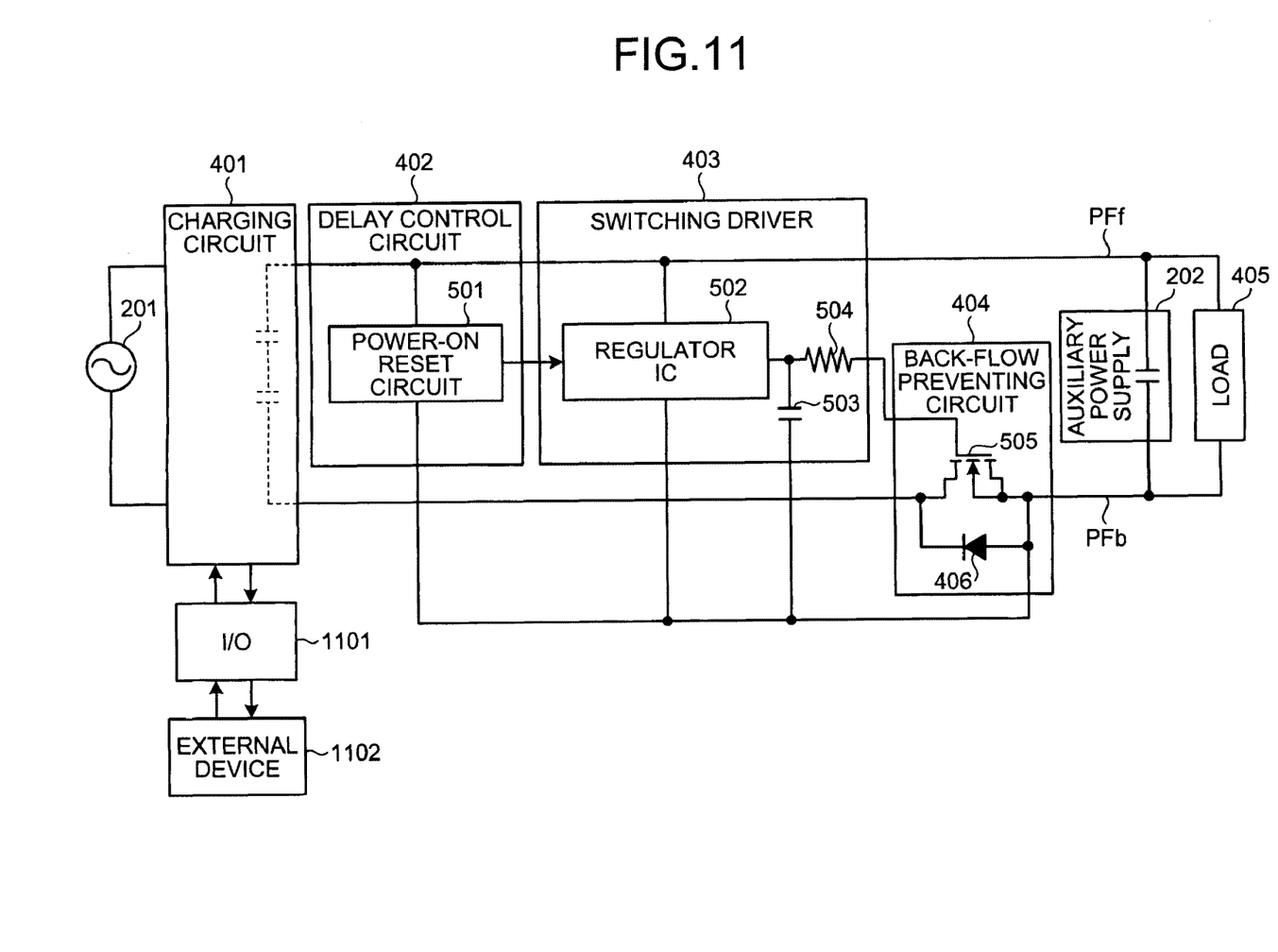
FIG. 11 is a block diagram of a power supply device of Example 6.

FIG. 11 is a block diagram of a power supply device of Example 6. In Example 6, an I/O interface 1101 that communicates the control signal (charging/stopping instruction signal) and a state signal with an external device 1102 detects an operation mode of the external device 1102 based on the state signal received from the external device 1102. The I/O interface 1101 outputs the charging/stopping instruction signal corresponding to the detected operation mode to the charging circuit 401. Other configurations of the power supply device of Example 6 are basically same as those of Example 1 (see, FIG. 5).

In Examples 1 to 5, although the nMOS transistor 505 is used as the switch of the back-flow preventing circuit 404, the nNOS transistor 505 can be replaced by a relay bipolar transistor. Furthermore, the nMOS transistor 505 can be replaced by a pMOS transistor by inverting logics of control and drive circuit. By using an nMOS transistor for the switch of the switching driver 403, extremely low power consumption can be achieved.

According to the embodiment, the back-flow preventing circuit that accurately operates with a power consumption lower than that of a silicon diode or a Schottky diode can be achieved, and the back-flow preventing circuit can be adopted when the main power supply is a commercial AC power supply, a battery, or an engine generator. Furthermore, the power supply device is effective in achieving a high efficiency, a low cost, and downsizing of the auxiliary power supply device when the main power supply is one with a low capacitance, such as a low-power DC power supply, a solar generator, or an aerogenerator.

According to an aspect of the present invention, a back flow from a capacitor to a charging unit can be prevented and charging efficiency can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
   a first capacitor configured to be charged and discharged to drive a load;
   a charging unit that charges the first capacitor;
   a switching unit that switches on and off between the first capacitor and the charging unit;
   a delay control unit that delays an output of a switching control signal for controlling the switching unit until an output voltage of the charging unit exceeds a voltage of the first capacitor, and outputs a delayed switching control signal; and
   an output unit that receives the delayed switching control signal from the delay control unit, and outputs the delayed switching control signal to the switching unit so that the charging unit charges the first capacitor.

2. The power supply device according to claim 1, further comprising a time constant circuit including a resistor and a second capacitor, for further delaying the delayed switching control signal from the output unit.

3. The power supply device according to claim 1, wherein
   the charging unit outputs a control voltage for determining whether the first capacitor is being charged,
   the delay control unit determines whether the first capacitor is being charged based on the control voltage, and when it is determined that the first capacitor is being charged, delays the output of the switching control signal until the output voltage of the charging unit exceeds the voltage of the first capacitor.

4. The power supply device according to claim 1, wherein the delay control unit includes a time constant circuit including a resistor and a second capacitor, for delaying the delayed switching control signal unit until the output voltage of the charging unit exceeds the voltage of the first capacitor, and
   a diode for discharging a charge of the second capacitor after the switching unit finishes a switching operation of switching on between the first capacitor and the charging unit.

5. The power supply device according to claim 1, wherein the delay control unit calculates a charging time in which the output voltage of the charging unit reaches the voltage of the first capacitor based on a difference between the output voltage of the charging unit and the voltage of the first capacitor, and delays the output of the switching control signal by a calculated charging time.

6. The power supply device according to claim 1, further comprising a comparing unit that compares the voltage of the first capacitor and a predetermined reference voltage, wherein
   when the voltage of the first capacitor reaches the reference voltage, the charging unit stops charging the first capacitor.

7. The power supply device according to claim 1, further comprising an interface unit that detects an operation mode of an external device connected to the power supply device, wherein
   the interface unit causes the charging unit to charge the first capacitor based on the operation mode.

8. The power supply device according to claim 1, wherein the switching unit is a metal oxide semiconductor transistor.

9. An image forming apparatus comprising a power supply device that includes
   a capacitor configured to be charged and discharged to drive a load;
   a charging unit that charges the capacitor;
   a switching unit that switches on and off between the capacitor and the charging unit;
   a delay control unit that delays an output of a switching control signal for controlling the switching unit until an output voltage of the charging unit exceeds a voltage of the capacitor, and outputs a delayed switching control signal; and
   an output unit that receives the delayed switching control signal from the delay control unit, and outputs the delayed switching control signal to the switching unit so that the charging unit charges the capacitor, wherein
   the capacitor supplies a power to a load of the image forming apparatus.

* * * * *